(12) United States Patent
Balasubramanian et al.

(10) Patent No.: US 8,555,257 B2
(45) Date of Patent: Oct. 8, 2013

(54) SYSTEM AND METHOD FOR NETWORKED SOFTWARE DEVELOPMENT

(75) Inventors: Rajesh Balasubramanian, Fremont, CA (US); Aron Sogor, Alameda, CA (US); Ka Kay Achacoso, Union City, CA (US); Vijay Natarajan, Maharashtra (IN)

(73) Assignee: Wind River Systems, Inc., Alameda, CA (US)

( * ) Notice: Subject to any disclaimer, the term of this patent is extended or adjusted under 35 U.S.C. 154(b) by 1465 days.

(21) Appl. No.: 11/602,732

(22) Filed: Nov. 20, 2006

(65) Prior Publication Data

US 2008/0120564 A1    May 22, 2008

(51) Int. Cl.
    G06F 9/44    (2006.01)
(52) U.S. Cl.
    USPC ........... 717/130; 717/101; 717/102; 717/103; 717/124; 717/128; 717/129; 717/131
(58) Field of Classification Search
    USPC ................. 717/124, 127, 129, 130, 166, 170; 709/217
    See application file for complete search history.

(56) References Cited

U.S. PATENT DOCUMENTS

| | | | |
|---|---|---|---|
| 5,892,941 A * | 4/1999 | Khan et al. ...................... | 703/22 |
| 6,216,237 B1 * | 4/2001 | Klemm et al. .............. | 714/38.11 |
| 6,219,782 B1 * | 4/2001 | Khan et al. ..................... | 712/227 |
| 6,438,468 B1 * | 8/2002 | Muxlow et al. ................... | 701/3 |
| 6,571,388 B1 * | 5/2003 | Venkatraman et al. ........ | 717/166 |
| 6,654,949 B1 * | 11/2003 | Fraenkel et al. .............. | 717/130 |
| 6,694,355 B1 * | 2/2004 | Bahar ........................... | 709/217 |
| 6,698,013 B1 * | 2/2004 | Bertero et al. ................ | 717/127 |
| 6,757,893 B1 * | 6/2004 | Haikin .......................... | 717/170 |
| 7,412,602 B2 * | 8/2008 | Park et al. ..................... | 713/182 |
| 7,555,676 B2 * | 6/2009 | Lopez et al. .................... | 714/27 |
| 7,607,164 B2 * | 10/2009 | Vasishth et al. .................... | 726/1 |
| 7,716,636 B2 * | 5/2010 | Goncharenko et al. ........ | 717/113 |
| 2002/0199172 A1 * | 12/2002 | Bunnell ....................... | 717/128 |
| 2003/0005415 A1 * | 1/2003 | Bates et al. ..................... | 717/129 |
| 2003/0191868 A1 * | 10/2003 | Espino ......................... | 709/328 |
| 2003/0233634 A1 * | 12/2003 | Carrez et al. .................. | 717/124 |
| 2004/0133444 A1 * | 7/2004 | Defaix et al. ...................... | 705/1 |
| 2004/0205747 A1 * | 10/2004 | Bernstein et al. .............. | 717/174 |
| 2005/0138113 A1 * | 6/2005 | Brendle et al. ................ | 709/203 |
| 2005/0193306 A1 * | 9/2005 | Luff et al. ..................... | 714/746 |
| 2006/0130054 A1 * | 6/2006 | Bocking et al. ............... | 717/173 |
| 2006/0277528 A1 * | 12/2006 | Chen et al. .................... | 717/124 |
| 2007/0006154 A1 * | 1/2007 | Yang et al. .................... | 717/124 |
| 2007/0168997 A1 * | 7/2007 | Tran ............................... | 717/129 |
| 2007/0169055 A1 * | 7/2007 | Greifeneder .................. | 717/158 |
| 2007/0234309 A1 * | 10/2007 | Davia et al. ................... | 717/130 |

* cited by examiner

*Primary Examiner* — Emerson Puente
*Assistant Examiner* — Charles Swift
(74) *Attorney, Agent, or Firm* — Fay Kaplun & Marcin, LLP

(57) ABSTRACT

A host having a network interface communicating with a plurality of users and a plurality of target devices, a workbench tool including software development tools, the plurality of users having access to the workbench, at least one user creating a first sensorpoint module using the workbench and a database storing the first sensorpoint module, the host loading the first sensorpoint module onto at least one of the target devices.

20 Claims, 6 Drawing Sheets

SYSTEM AND METHOD FOR NETWORKED SOFTWARE DEVELOPMENT

BACKGROUND INFORMATION

The ability to debug software programs is critical to software development. Debugging often involves monitoring variables and/or resources used in a software program. One conventional method of monitoring involves inserting print statements within the program's code. Monitoring may also be performed during specific times of the program's execution. For example, breakpoints are often used to pause or terminate program execution, allowing the developer to view the status of the variables/resources at the specified times.

The conventional debugging methods described above are limited in that because changes to the program code are required, the program must be recompiled and re-executed in order to view the results of the changes. Thus, the conventional debugging methods cannot be applied to programs that are currently being executed without interrupting the operation of the programs.

In addition, the conventional debugging methods are not suited for software development projects involving collaboration amongst multiple developers. Testing and code modification performed by one developer is not seen by the other developers, potentially resulting in project delays and redundant work. Therefore, a need exists for a system and method of software development that allows developers to create software dynamically in a collaborative environment.

SUMMARY OF THE INVENTION

A host having a network interface communicating with a plurality of users and a plurality of target devices, a workbench tool including software development tools, the plurality of users having access to the workbench, at least one user creating a first sensorpoint module using the workbench and a database storing the first sensorpoint module, the host loading the first sensorpoint module onto at least one of the target devices.

A method for providing access to a workbench to a plurality of connected users, the workbench including software development tools, receiving a first sensorpoint module from one of the plurality of users, the first sensorpoint module being created via the workbench, storing the first sensorpoint module and loading the first sensorpoint module onto one of a plurality of target devices.

A system having a target device, a plurality of user devices and a host in networked communication with the target device and the plurality of user devices, wherein the host includes a workbench tool accessible to users of the plurality of user devices, the workbench tool allowing at least one of the users to create a sensorpoint module, store the sensorpoint module onto a database of the host, and load the sensorpoint module onto the target device.

DETAILED DESCRIPTION

Figure 1:
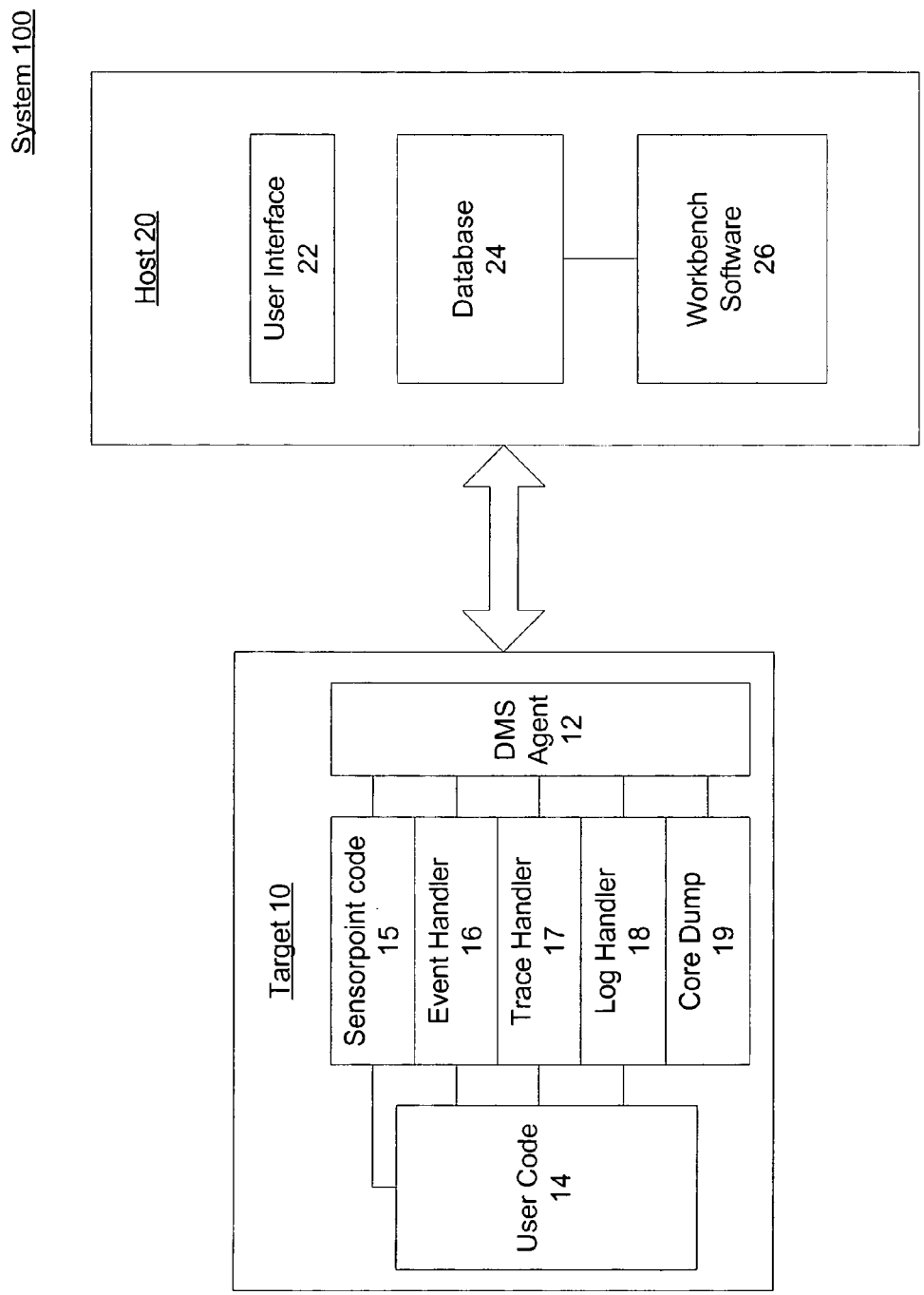
FIG. 1 shows an exemplary embodiment of a system for software development according to the present invention.

The present invention may be further understood with reference to the following description of exemplary embodiments and the related appended drawings, wherein like elements are provided with the same reference numerals. The present invention is related to systems and methods used to develop software. More specifically, the present invention is related to systems and methods for networked software development. However, those skilled in the art will understand that the exemplary embodiments may also be used for software monitoring and/or monitoring a process controlled by a particular software program. Thus, while the exemplary embodiment is described with reference to software development, the exemplary systems and methods may also be applicable to other stages of a software program's life.

Software programs are often created on a computing device and ported to an external target device, which may be a consumer device such as cell phone, a PDA, or a diagnostic/monitoring device designed for use within a company's network. Embodiments of the present invention will be described with reference to the development of software for these target devices in both networked and non-networked environments.

FIG. 1 shows an exemplary system 100 according to the present invention. The system 100 includes a target device 10 and a host 20. In one embodiment, both the target 10 and the host 20 may be located in a lab environment, while in another embodiment, the target 10 and/or the host 20 may be in a field environment. For example, the target 10 may be deployed in a warehouse, office, etc., while the host resides in a laboratory or central server location. The target 10 and the host 20 may include conventional computing components such as a processor (e.g., a microprocessor, an embedded controller, etc.) and a memory (e.g., Random Access Memory, Read-only Memory, a hard disk, etc.). Communication between the target 10 and the host 20 occurs over a communication link, which may be a wired (e.g., Ethernet, serial port, Universal Serial Bus, etc.) or wireless (e.g., Bluetooth, IEEE 802.1x, etc.) connection.

The host 20 may include a user interface 22, a database 24 and workbench software 26. The user interface 22 enables a user (e.g., a software developer) to interact with the host 20 by receiving instructions and data requests. The user interface 22 may comprise any number of standard input and/or output devices, such as a keyboard, a mouse, a display, etc. Through the user interface 22, the developer can instruct the host 20 to transmit data to and/or from the target 10. The data may include sensorpoint modules and monitoring data. As will be discussed in detail below, sensorpoint modules comprise program code that the developer can implement on the target 10. Monitoring data may include any relevant data that the developer wishes to receive from the target 10, such as device information, alarms and error messages, data logs, and audit information (e.g., information related to users modifying devices and/or sensorpoint modules). The monitoring data may also relate to device type. For example, if the target 10 is a cell phone, the monitoring data may include call usage information, signal strength information, etc. The monitoring data may be transmitted automatically (e.g., a predetermined intervals) or upon request by the developer. For example, the developer may request to view a log file generated by the target 10 in order to view specific program output.

The workbench software 26 is a software development tool used by the developer to create, modify, debug and test software programs. The workbench software may comprise a software suite that includes any number of individual software development programs, such as a compiler, a debugger, a source code analyzer, a text editor, etc. These individual programs may either be run independently or within a main development program. Using the workbench software 26, the developer can create a sensorpoint module, write code for the sensorpoint module, compile the code and save it to the database. Once the sensorpoint module is saved, it may be selected for transmission to the target 10. Those skilled in the art will understand that the sensorpoint code as written may not be the same as the actual code executed by the target 10. For example, the actual code may be an executable binary file created as a result of compiling and linking the sensorpoint code. The binary may be included in the sensorpoint module as an object file. In addition, the sensorpoint module may include multiple files, such as source, header and library files. These files may be installed individually or together with the entire sensorpoint module.

The database 24 stores sensorpoint modules, monitoring data and other types of data specified by the developer. The database 24 may also include user information, customer information, information regarding the target 10 (e.g., device type), etc. The database 24 may be organized in any number of ways, including separate data structures for holding information corresponding to a specific target, a specific data type (e.g., sensorpoint modules), etc. The database 24 also allows for sensorpoint modules to be grouped together according to the specifications of the developer. For example, the developer may wish to group sub-components of a larger program together. The database 24 is located on a writable memory, and may be accessed via the user interface 22.

The target 10 may include a Device Software Management (DMS) agent 12 that communicates with the host 20 via the communication link. The DMS agent 12 coordinates the sending and receiving of data. Instructions and data requests are received by the DMS agent 12 and processed accordingly. When data is transmitted or received, the DMS agent 12 may first place the data into a buffer. For example, received sensorpoint modules may be temporarily stored in a buffer before writing to the memory of the target 10. Likewise, data transmitted to the host 20 may first be placed in a buffer and sent when the data is ready for transmission and/or the host 20 is ready to receive the data. The DMS agent 12 may be implemented in hardware, software, or a combination thereof.

The target 10 operates using a user code 14, which comprises a program running in an operating system or a standalone program. The user code 14 may be written in any programming language (e.g., C/C++, Assembly language, etc.). The user code 14 may be any program that the developer wishes to run on the target 10. For example, the user code 14 may be a main program or subroutine being developed for implementation on the target 10. The user code 14 may include source, header, library, object, and other data files.

The target 10 may also include sensorpoint code 15. Similar to the user code 14, the sensorpoint code 15 may include source, header, library and object files. According to the embodiments of the present invention described herein, a sensor point is defined as a piece of code that is compiled independently of a running application (e.g., the compiled user code 14) and executed by the running application via branch instructions inserted into the running application (e.g., the executable binary). For example, the sensorpoint code 15 may be written in the C programming language, compiled and linked on the host 20, saved as a sensorpoint module in the database 24, and transmitted to the target 10 for execution. Branch instructions are inserted into a specific location(s) (i.e., instrumentation points) of the user code 14 as desired by the developer, and may also be transmitted from the host 20 as part of the sensorpoint module. In other embodiments, the sensorpoint code 15 may be written and the instrumentation points specified through a user interface located on the target 10 itself. The branch instructions may be inserted by patching the running user code 14 with precompiled branch instructions pointing to the sensorpoint code 15. When the application reaches the instrumentation point(s), the sensorpoint code 15 is run before execution of the user code 14 resumes. Thus, the developer may debug and develop the user code 14 without having to recompile or interrupt the execution of the user code 14. In addition, the developer may retrieve any type of information that is stored or created by the running user code 14 (e.g., register values, memory usage statistics, collected process data, etc.) without interrupting the user code 14.

The target 10 may also include an event handler 16, a trace handler 17, a log handler 18 and a core dump 19. The event handler 16 responds to events encountered during execution of the user code 14. The events may be user-created (e.g., a mouse click, a menu selection, etc.) or program generated (e.g., a program exception, a software interrupt, etc.). The trace handler 17 stores trace information specified by the user code 14. For example, the trace information may include all read and write instructions, along with corresponding data values and variable names. The trace handler 17 works in conjunction with the log handler 18 to store the trace information into one or more log files, which may then be outputted (e.g., displayed at the target 10 or transmitted to the host 20) for viewing. Using the log handler 17, the developer can specify where log files and what types of information (e.g., reads/writes, error messages, etc.) should be stored. The core dump 19 handles program crashes by providing a log for specific memory contents, which can be viewed after the program crashes.

Figure 2:
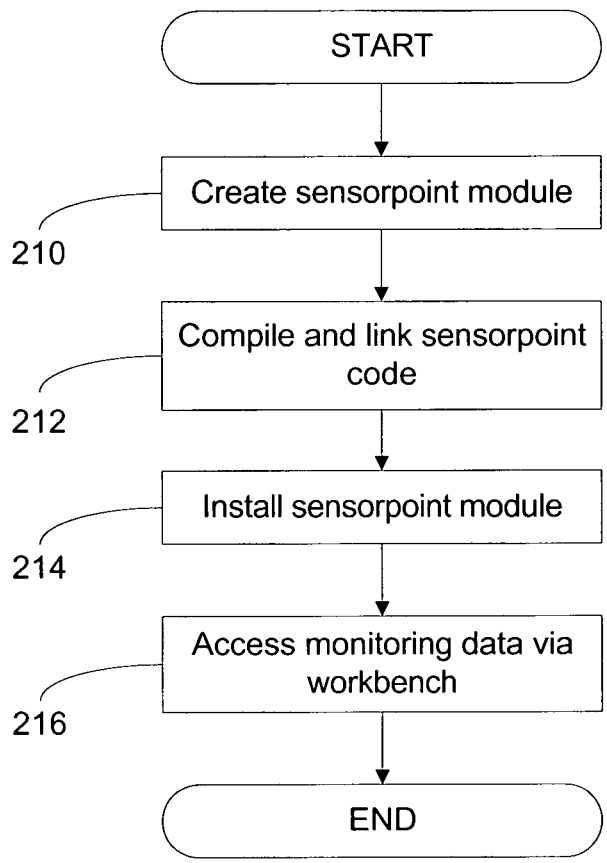
FIG. 2 shows an exemplary embodiment of a method for software development according to the present invention.

FIG. 2 shows an exemplary method 200 for software development according to the present invention that will be discussed with reference to the system 100. Beginning with step 210, a sensorpoint module is created using the workbench software 26. As previously discussed, the sensorpoint module is a software component that includes the compiled sensorpoint code and instructions relating to how the compiled sensorpoint code should be implemented. The workbench software 26 may be accessed using the user interface 22, or from the target 10 if the target 10 has its own user interface. If the sensorpoint module is a newly created module, the sensorpoint code is written, packaged within the module and stored in the database 24. Alternatively, if the sensorpoint module already exists, the existing sensorpoint code is modified and saved. The developer then specifies the user code 14 location(s) in which the branch instruction(s) should be placed.

In step 212, the sensorpoint code is compiled using the workbench software 26 and saved in the database 24 along with the rest of the sensorpoint module. The sensorpoint code is then linked. That is, the individual files (source, header, library, etc.) that comprise the sensorpoint code are combined into a single executable file (i.e., the executable binary). For example, if the programming language is C, the individual files may be placed into a User Action Library (UAL) file.

In step 214, the sensorpoint module is installed by transmitting it to the target 10. The DMS agent 12 receives the sensorpoint module, saves it into memory allocated to the sensorpoint code 15, processes the executable binary and updates the user code 14 with the branch instructions. During this time, the target 10 continues to execute the user code 14 and does not encounter any interruption during running of the user code 14. If the user code 14 encounters the breakpoint(s) during execution, program execution is temporarily suspended in order to allow the sensorpoint program to execute.

In step 216, the monitoring data is accessed via the workbench software 26. The developer views the monitoring data, determines whether results of the user program are as expected and, if necessary, makes changes to the sensorpoint code 15 by repeating steps 210-216.

Figure 3:
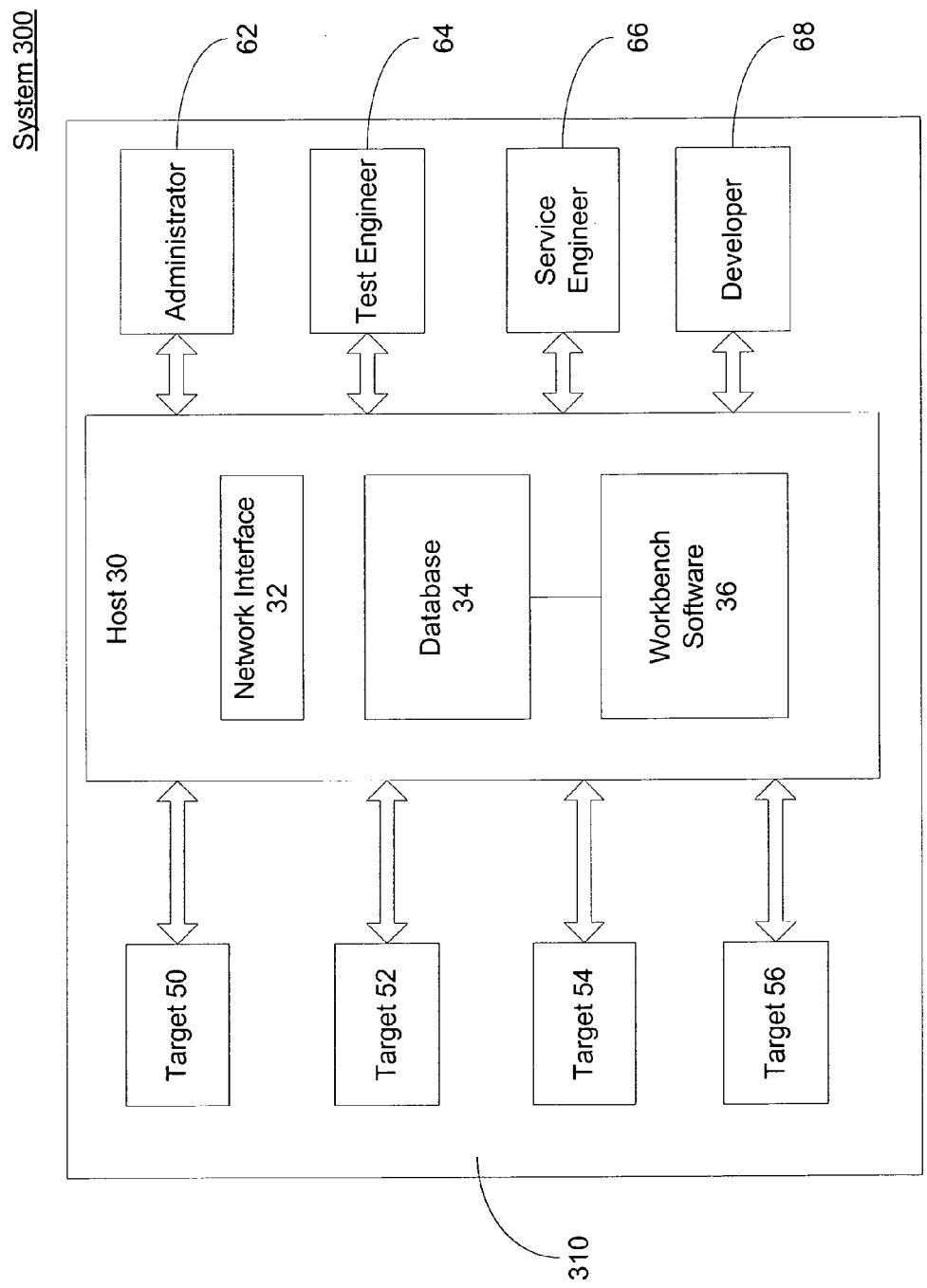
FIG. 3 shows an exemplary embodiment of a system for networked software development according to the present invention.

The advantages of using sensor points have been discussed above with reference to the system 100 of FIG. 1. Further advantages and uses of sensor points will now be discussed with reference to a system 300 shown in FIG. 3 and to FIGS. 5-6. The system 300 includes one or more hosts 30 and one or more targets 50, 52, 54 and 56. The targets 50-56 may be substantially similar to the target 10 and may include user code, sensorpoint code, handlers, a core dump and a DMS agent. The targets 50-56 may be similar devices (e.g., cell phones, handheld computers, etc.) and/or have similar functions (e.g., security, communications, etc.). Physically, the targets 50-56 may be fixed or mobile, located together or separately. However, the targets 50-56 and the host 30 are each located within a network 310, which may be a wired and/or wireless network. Accordingly, one or more of the targets 50-56 may wirelessly connect to the host 30 via their respective DSM agents, while the remaining targets 50-56 connect via a wired connection.

The host 30 may include components substantially similar to that of the host 20. For example, the host 30 includes a database 34 and workbench software 36. In other embodiments, the workbench software 36 may be located on a separate computing device (e.g., a development host) that is communicatively coupled to the host 30. However, in the exemplary embodiment, the workbench software 36 is installed on the host 30 and the user interface 22 included with the host 20 is replaced with a network interface 32. The network interface 32 allows multiple users to access the targets 50-56 via the host 30. The users may each perform a role in developing the user code on the targets 50-56, or may have an interest in viewing the monitoring data from the targets 50-56. Thus, the users may include one or more developers 68, administrators 62, test engineers 64, and service engineers 66. The role of the developer is to create software programs for implementation on the targets 50-56. The administrator oversees operation of the network 310 and may be interested in viewing data traffic and communications between the targets 50-56 and the host 30. The test engineer 64 and the service engineer 66 maintain and troubleshoot operation of the network 310 and may be interested in using monitoring data for network testing and repair purposes.

Each of the users 62-68 may be wired or wirelessly connected to the host 30 through a user device that enables the user to perform his role such as a laptop, a desktop, diagnostic equipment, etc. The users 62-68 need not be located within proximity of each other. Each of the users 62-68 can access the database 34 and/or the workbench software 36. Monitoring data may be transmitted directly to the user device via the host 30 or saved in the database 34 before transmission. Thus, sensorpoint code, monitoring data and other types of data stored in the database 34 are available for any of the users 62-68 to access. In some embodiments, access may be restricted according to an identity or role of the user. For example, only administrators and developers may have access to the sensorpoint code whereas any user may have access to the monitoring data.

Figure 4:
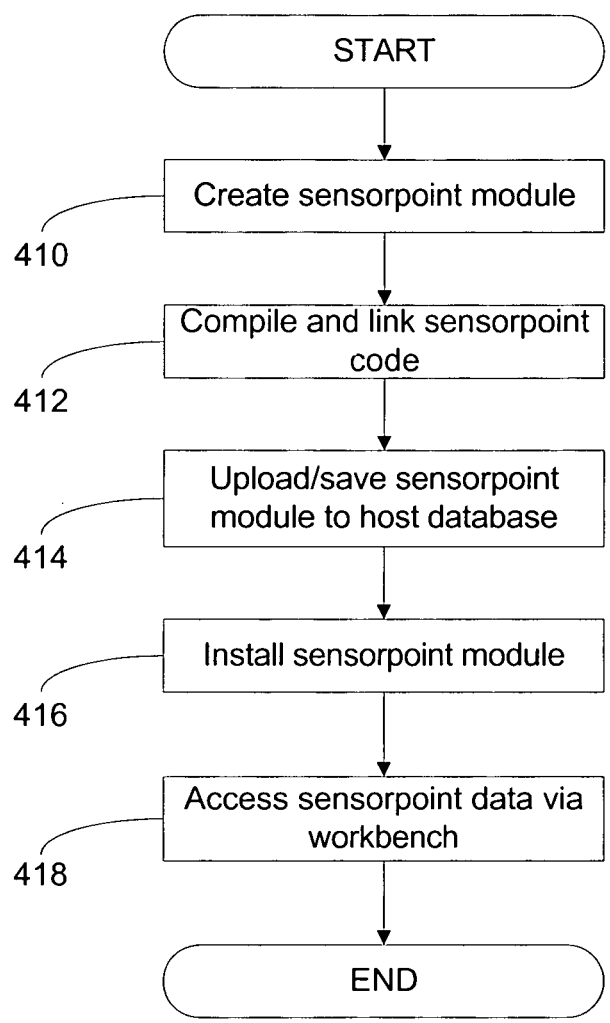
FIG. 4 shows an exemplary embodiment of a method for networked software development according to the present invention.

FIG. 4 shows an exemplary embodiment of a method 400 for networked software development according to the present invention that will be described with reference to the system 300. In steps 410 and 412, a sensorpoint module is created, compiled and linked in a manner similar to that of steps 210 and 212 of the method 200. However, the sensorpoint module is created on the developer's 68 user device rather on the host 30. The compiled and linked files may be transmitted back to the user device or stored as temporary files in the database 34.

In step 414, the sensorpoint module is uploaded and/or saved to the database 34. In addition to storing the executable sensorpoint module, any file (e.g., source, header, library, etc.) pertaining to the sensorpoint module may be stored for later access by the users 62-68. If the sensorpoint module is located on the user device, the sensorpoint module and any related files are transmitted from the user device to the host 30. Otherwise, the sensorpoint module and the related files are converted from temporary files to permanent files in the database 34.

In steps 416 and 418, the sensorpoint module is installed and the monitoring data accessed in a manner similar to steps 214 and 216 of the method 200. The sensorpoint module may be installed on a single or multiple ones of the targets 50-56. Any user 62-68 with sufficient access privileges may initiate installation. The sensorpoint module may be selected using an interface (e.g., a web interface) such as the exemplary interfaces 500 and 600 shown in FIGS. 5 and 6.

The interfaces 500, 600 may be hosted on a web server in communication with the host 30. The interfaces 500, 600 provide a menu from which, depending on the role of the user, allows the user to upload, download, install and uninstall sensorpoint modules; and view information related to targets, sensorpoint modules and other users. In the exemplary embodiments of the interfaces 500, 600 the user has logged into the interface using the credentials of the administrator 62. As an administrator, the user 62 may have access to options that are not available to the other users 64-68. For example, the administrator 62 can manage user accounts and install sensorpoint modules onto any target 50-56. In the exemplary embodiments, the administrator 62 can select lists of items using the menu options, including lists of devices, logs, alarms, sensorpoint modules, sensorpoint module groups and various administration options. The interfaces 500, 600 will now be described in detail below with reference to FIGS. 5 and 6.

Figure 5:
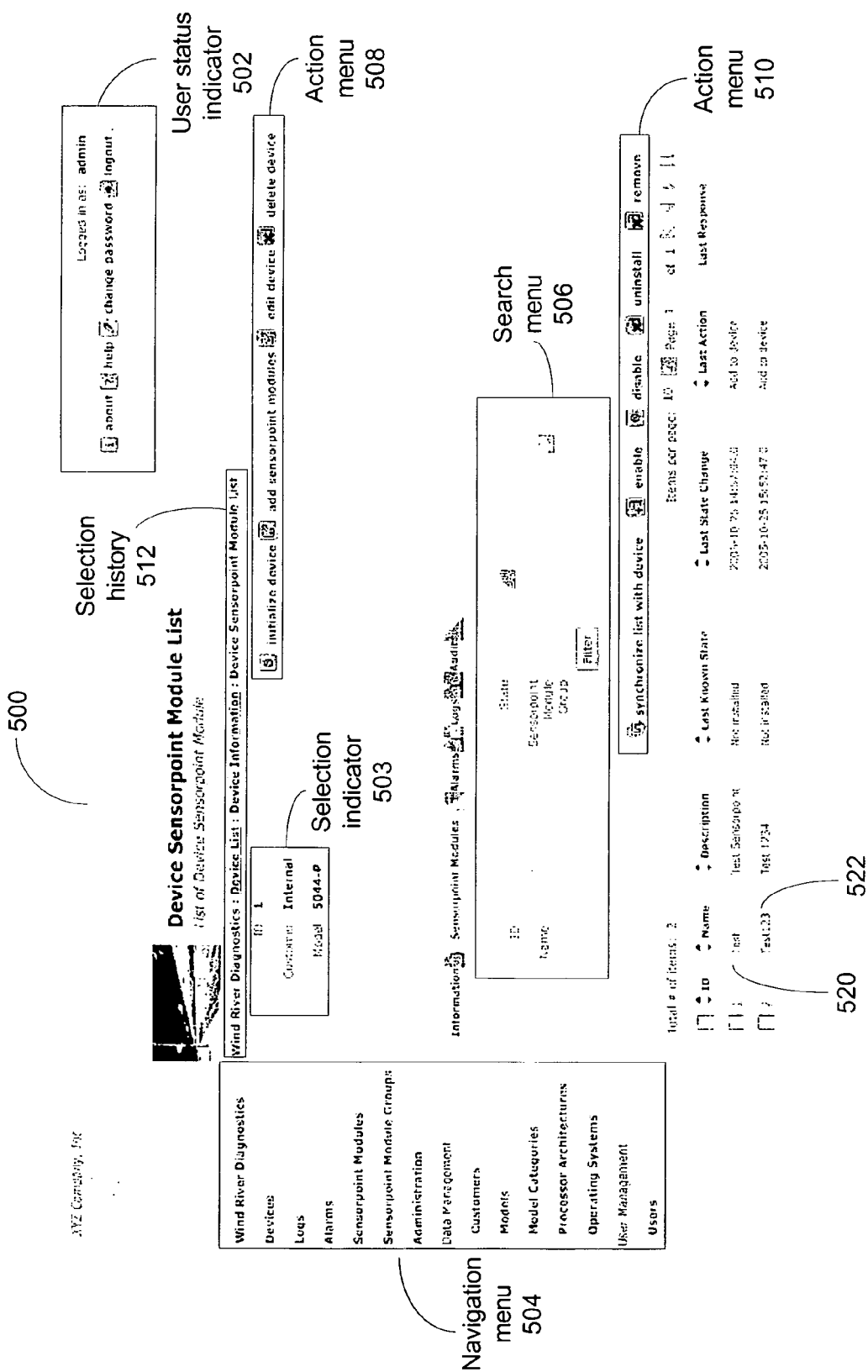
FIG. 5 shows an exemplary embodiment of a web interface according to the present invention

FIG. 5 shows an exemplary embodiment of the interface 500 according to the present invention. The interface 500 may include a user status indicator field 502, a navigation menu 504, a selection indicator field 503, a search menu 506, action menus 508 and 510, and a selection history field 512. The user status indicator field 502 provides information related to the user's account, such as an identity of the user. For example, in the exemplary embodiment, the user status indicator field 502 shows the user logged in with a user identifier, "admin." Thus, the user is the administrator 62. The user status indicator field 502 may also provide a list of menu options related to the managing of the user's account and providing documentation and/or help regarding the interface 500. For example, the user status indicator field 502 may include an "about" field that provides information (e.g., software version, copyright and license information, etc.) about the interface 500. The user status indicator field 502 may also include a "help" option which, when selected, provides the user with access to help topics via a list of topics, a searchable index, etc. In addition, the user status indicator field 502 provides the user with access to account management options such as password settings. The menu options may also provide a convenient means for the user to exit (e.g., log out of) the interface 500.

The navigation menu 504 provides additional menu options for installing sensorpoint modules, managing customer records, monitoring devices, and managing user records. For example, the navigation menu 504 may include diagnostic options that allow the user to view device information, log file information, alarm information, sensorpoint module information, and sensorpoint module group information. Device information may be provided for each device in a list of devices onto which sensorpoint modules may be installed. The device information identifies a device and provides status information for the device. For example, the device information may show whether the device has been selected from the device list and whether software modules have been installed onto the device. In an exemplary embodiment, the device information is viewable by any of the users 62-68. For example, the developer 68 may be developing software using the target 50 and has installed a first sensorpoint module (e.g., Test 520) onto the target 50. Another developer (not shown) may also be developing software and wishes to install a second sensorpoint module (e.g., Test123 522) that he has written onto a target for testing and debugging. This other developer views the device information and notices that the first sensorpoint module is already executing on the target 50. Not wanting to interfere with the execution of the first sensorpoint module, the other developer decides to install the second sensorpoint module onto another target (e.g., target 52). Alternatively, the other developer may decide to install the second sensorpoint module onto the target 50 in order to observe the effects of executing the first and second sensorpoint modules concurrently.

The log file information provides access to log file data that may be viewed by the user for diagnostic and troubleshooting purposes. For example, the log file data may be an error log that records error events such as sensorpoint module installation failures, device execution errors, sensorpoint module compilation errors and other types of error events. In an exemplary embodiment, the log file information may be viewed by any of the users 62-68. Thus, the administrator 62 may notice an error occurring on a target (e.g., target 50) on which the developer 68 is developing software. The administrator 62 notifies the developer 68, who then takes corrective action (e.g., rewriting sensorpoint code, re-installing a sensorpoint module, rebooting the target 50, etc.). In other embodiments, access to the log file information may be restricted according to the role of the user. For example, the developer 68 may only have access to log file information corresponding to the target 50 if the target 50 is the only device for which the developer 68 is developing software.

The sensorpoint module information provides information relating to sensorpoint modules stored in the database 34. For example, the sensorpoint module information may include a list of files (e.g., source, object, data, etc.) associated with each sensorpoint module and a status of each sensorpoint module (e.g., a list of targets on which each sensorpoint module has been installed). Additional information may be included for each sensorpoint module, such as a module timestamp indicating a date/time during which a sensorpoint module was last modified, an identifier for a user who last modified the sensorpoint module, an identifier for a user who created the sensorpoint module, an identifier for a user who last viewed the sensorpoint module, a list of sensorpoint module access permissions (e.g., read, write, modify, execute, etc.) available to the user, a size (e.g., number of bytes) of the sensorpoint module, a description of the sensorpoint module, a list of targets on which the sensorpoint module is installed, etc. In an exemplary embodiment the sensorpoint module information is viewable by any of the users 62-68. For example, if the developer 68 and another developer are both working on the sensorpoint module Test 520, both developers are able to view information associated with the module Test 520. This allows the developers to track changes made by each other to the module Test 520. If the developer 68 wants to work on a particular file within the module Test 520 and notices that the module 520 has recently been modified by another developer, the developer 68 may consult the other developer to make sure that it is acceptable to modify the module Test 520. Alternatively, the developer 68 may choose to create a copy of the module 520 and modify the copy. Similarly, if the developer 68 notices that the module Test 520 has been installed onto a target by the other developer, the developer 68 may refrain from modifying any files associated with the module Test 520.

The sensorpoint module group information may be a list of sensorpoint modules that have been grouped together by the user. The sensorpoint modules may be grouped in any number of ways, including, but not limited to, grouping according to size, function, name and user ID. In an exemplary embodiment, sensorpoint modules that relate to a particular project are grouped together. For example, the modules Test 520 and Test123 522 may comprise different portions of a functional component in a software development project. The modules 520, 522 may be grouped together to make this association clear to the user and the group may be given a title such as "X component." In another exemplary embodiment, the developer 68 may wish to group together each sensorpoint module that he has written in order to organize the modules so as to allow the developer 68 to more easily distinguish his own modules from those of other developers.

When grouping the sensorpoint modules, the user may choose to allow the sensorpoint modules to share access to files. For example, if the module Test 520 and the module Test123 522 both output to the same file or read from the same file, the grouping allows the modules 520, 522 to access the file without requiring multiple copies of the file. This technique essentially creates a large sensorpoint module comprised of smaller individual sensorpoint modules and reduces the size of the individual modules, since files can be shared rather than duplicated for each module. Thus, if the user is concerned about resource usage (e.g., memory usage, disk space, etc.), the user may choose to install a sensorpoint module group rather than installing sensorpoint modules individually. In other embodiments, files may not be shared, and the grouping of the sensorpoint modules may simply form an association between the modules.

If the user is the administrator 62, the navigation menu 504 may also include access to administration options, such as managing customer records, models, processor architectures, and user records. The administrator 62 can browse customer records and perform any required maintenance, such as updating accounting and billing statements, contact information, etc. The administrator 62 can also browse for sensorpoint modules created for specific processor architectures and operating systems. For example, the developer 68 may be developing a software program for a Pentium architecture and a Windows operating system (OS), while another developer may be developing a similar program on a PowerPC architecture and a Linux OS. Using the navigation menu 504, the administrator 62 can view the progress of software development with reference to the specific processor architectures and operating systems and make administrative decisions based on the progress. For example, if the development of the program for the Pentium architecture/Windows OS is behind schedule and the development of the program for the PowerPC architecture/Linux OS is ahead of schedule, the administrator may decide to temporarily suspend activity on the latter program and set the other developer to work on the former.

The administrator may also use the navigation menu 504 to update and/or modify user records. The updating and modifying may include such functions as changing user IDs and passwords, and changing a user profile (e.g., contact information, access privileges, etc.). The administrator 62 may also view information about the users that is viewable only by the administrator 62 and normally hidden from the users. For example, the administrator 62 can view a list of users currently active on the network 310 (e.g., currently logged into the interface 500). User activity may also be viewable to the administrator 62. For example, if the developer 68 is executing a sensorpoint module on the target 50, the administer 62 may notice that the target 50 is running a program on the network 310 and/or consuming resources (e.g., bandwidth, memory, etc.). This allows the administrator 62 to monitor user activity and prevent unauthorized use of the network 310.

The selection indicator field 503 displays a current selection to the user. For example, in the exemplary embodiment shown in FIG. 5, the user has selected a target (e.g., target 50) with ID, "1" and model, "5044-P." The selection indicator field 503 may be updated to reflect the current selection depending on what the user has selected using the navigation menu 504 and/or other menus. For example, if the user selected to view a log file, the selection indicator field 503 will be updated to display information for the selected log file.

The selection history 512 displays a history of options selected from the navigation menu 504 by the user. For example, in the exemplary embodiment, the user chose to view diagnostic information, followed by subsequent selections of device information and a device sensorpoint module list. The selection history 512 may be used to quickly navigate between previous selections. In the exemplary embodiment, the user may, for example, choose to return to the selection of device information via the selection history 512 rather than re-selecting the diagnostic information and device information options using the navigation menu 504.

The search menu 506 allows the user to search for items related to the current selection. For example, in an exemplary embodiment where the user has selected to view the device sensorpoint module list, the search menu 506 includes options to allow the user to search for sensorpoint modules. The user may search for sensorpoint modules installed onto a device using the device's ID. Other search options include searching for a sensorpoint module by name, state (e.g., installed/uninstalled, enabled/disabled) and group. The search options may be provided through any combination of user interface features, such as text, radio and check boxes, drop-down menus, etc.

The action menus 508, 510 enable sensorpoint modules to be installed onto targets. For example, the action menu 508 may allow the user to initialize a target, add sensorpoint modules to the target, edit the target's configuration and delete the target from the device list. Other options may also be available based on the user's selection of the navigation menu 504.

The action menu 510 may allow the user to view a list of sensorpoint modules installed on the selected target. Via the action menu 510, the user can install, uninstall, enable and disable sensorpoint modules on the selected target. In addition, the user can remove sensorpoint modules from the sensorpoint module list. The action menu 510 also allows the sensorpoint module list to be synchronized with the selected target. This allows the user to view the latest changes (e.g., installed/uninstalled sensorpoint modules) to the selected target. The advantages of this feature can readily be seen in the context of a networked software development environment where multiple developers and/or other users can make changes to the selected target. In this context, synchronizing the sensorpoint module list with the selected target provides the user with up-to-date information, thereby facilitating the coordination of software development activities related to the selected target.

Figure 6:
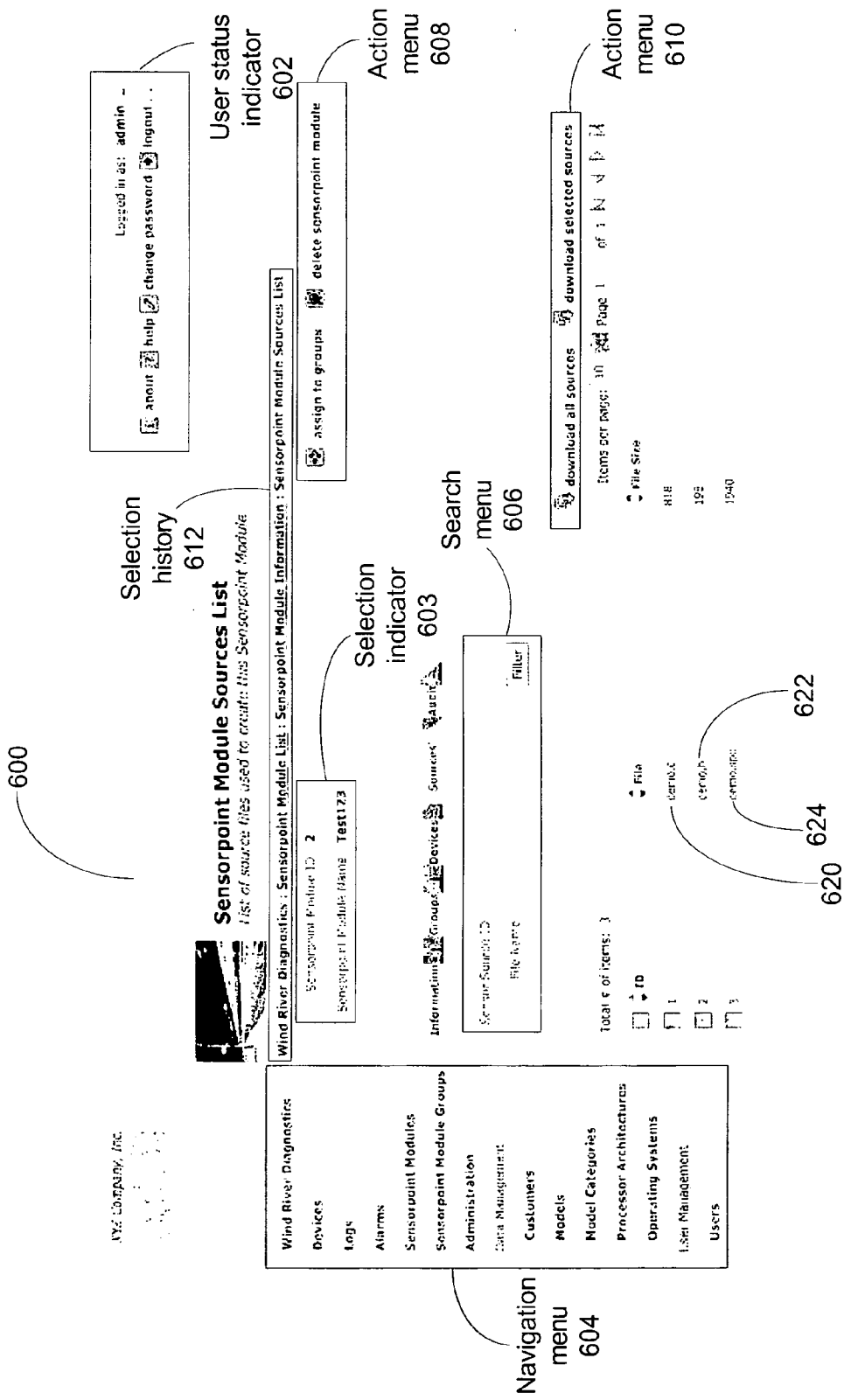
FIG. 6 shows another exemplary embodiment of the web interface of FIG. 5 according to the present invention.

Referring now to FIG. 6, an exemplary embodiment of the interface 600 is shown where the user has selected to view a sensorpoint module sources list. This selection is indicated by the selection history 612. Specifically, the user has chosen to view the sensorpoint module list, followed by sensorpoint module information and the sensorpoint module sources list. The sensorpoint module sources list is a list of all source files associated with the sensorpoint modules. In an exemplary embodiment, the sensorpoint module sources list may also include other types of files (e.g., object, data, library, etc.) associated with the sensorpoint modules. However, in other embodiments, the sensorpoint module source list may not include non-source files, which may be accessed via other menu options.

As shown in FIG. 6, the interface 600 includes a navigation menu 604, which may be substantially similar to the navigation menu 504 shown in FIG. 5. For example, the navigation menu 604 may include menu options allowing the user to access diagnostic information relating to devices, log files, alarms, sensorpoint modules, sensorpoint module groups; as well as administrative options relating to customer records, models/model categories, processor architectures, operating systems, and user records.

The interface 600 may also include a user status indicator 602. As with the exemplary embodiment of the interface 500, the user is logged into the interface 600 as the administrator 62. Other components of the interface 600 may include a selection indicator 603. As shown, the selection indicator 603 indicates that a sensorpoint module (e.g., the module Test123 522) with ID, "2" has been selected by the user.

Based on the user's selection of the sensorpoint module sources list, a search menu 606 may be displayed, allowing the user to search for sensorpoint modules by ID and/or file name. Action menus 608 and 610 may be provided to allow the user to engage in a sensorpoint module related action. For example, the action menu 608 may allow the user to assign the selected sensorpoint module to a group or delete the sensorpoint module from the sensorpoint module list. The action menu 610 may allow the user to select individual files associated with the selected senesorpoint module for downloading to the user's device. The files may be downloaded individually by, for example, selecting check boxes associated with each file; the files may also be downloaded together simultaneously.

As shown, the selected sensorpoint module (e.g., module Test123 522) includes files "demo.c" 620, "demo.h" 622 and "demo.spc" 624. If the user is the developer 68, the user may choose to download the source file demo.c 620, modify it, then upload it to the database 34 for testing on a target. In an exemplary embodiment, when a file associated with a sensorpoint module is modified, a file timestamp is created indicating an identity of the user who modified the file and/or a time during which the change took place. This enables the users 62-68 to track changes made to the files. The most recent of the file timestamps may be used as the module timestamp described with reference to the interface 500. Thus, any changes to the selected sensorpoint module and/or files associated with the selected sensorpoint module can be viewed by the user.

Those skilled in the art will understand that the menu options described with reference to the interfaces 500, 600 may change according to selections made by the user. The menu options may also change according to the role of the user. In general, the administrator has the most menu options. However, in other embodiments, the other users 64-68 may have access to menu options not available to the administrator 62. Thus, the menu options described are exemplary and do not limit the ability of the user to access user, customer, sensorpoint module, device and other types of data pertinent to the operation of the network 310.

In addition to sharing access to devices, the users may also share access to sensorpoint modules. In an exemplary embodiment, the developer 68 can specify access privileges to sensorpoint modules via the interfaces 500, 600. For example, when uploading the module Test 520, the developer 68 may choose to share access to the module Test 520 with other non-administrative users, such as the developer 68. If the module Test 520 is being developed jointly with another developer, the developer 68 may choose to allow shared read and write privileges. Alternatively, if the module Test 520 is not being jointly developed, but another developer has expressed interest in viewing source code associated with the module Test 520, the developer 68 may only choose to allow read privileges. For example, the other developer may wish to modify a sensorpoint module written by the developer 68 and running on the target 50. To accomplish this, the other developer may download the sensorpoint module from the database 34, modify the sensorpoint module and save it under a different name, then install the modified sensorpoint module on another target (e.g., target 52) for debugging and development. Thus, the developer 68 may allow any number of users to view and/or modify the module Test 520. In a networked software development environment, this shared access to sensorpoint modules facilitates project workflow by creating information transparency.

Other users may also benefit from the present invention. For example, the administrator 62 can install sensorpoint modules as software updates or patches to the targets 50-56, for beta-testing, diagnostic, and other purposes. The sensorpoint modules can be installed to multiple targets at the same time or individually. Thus, the system 300 gives the administrator 62 control over which sensorpoint modules are installed. Because user activities may be transparent to the administrator 62, the administrator 62 can monitor software development progress and intervene when necessary by alerting users to particular network events (e.g., an error event) and taking corrective measures (e.g., aborting a currently executing sensorpoint module).

The test and service engineers 64, 66 also benefit by being able to access the sensorpoint modules and evaluating their effects on the network 310 for testing, maintenance and repair purposes. For example, if the developer 68 has decided to share access to the module Test 520, the test engineer 64 may choose to install the module Test 520 onto a target (e.g., target 54) in order to determine whether the module Test 520 is causing an error event, while the service engineer 66 may decide to download source code for the module Test 520 in order to study the code in detail and determine the cause of the error event.

There are many modifications of the present invention which will be apparent to those skilled in the art without departing from the teaching of the present invention. The embodiments disclosed herein are for illustrative purposes only and are not intended to describe the bounds of the present invention which is to be limited only by the scope of the claims appended hereto.

What is claimed is:

1. A host, comprising:
 a processor;
 a network interface communicating with a plurality of users and a plurality of target devices, wherein each of the target devices includes user code and a running application;
 a workbench tool including software development tools, the plurality of users having access to the workbench, at least one user creating a first sensorpoint module using the workbench, wherein one of the software development tools compiles and links the first sensorpoint module at the host independently from the user codes and running applications of each of the target devices; and
 a host database storing the first sensorpoint module and a branch instruction for each of the target devices, the host loading each of the branch instructions from the host database into the running applications of each of the target devices, wherein each of the branch instructions points to the first sensorpoint module and execution of the first sensorpoint module suspends execution of the running application on each of the target devices.

2. The host of claim 1, wherein the first sensorpoint module includes sensorpoint code, the sensorpoint code comprising at least one of a source file, a header file, a library file and an object file.

3. The host of claim 1, wherein the host includes a user interface allowing the at least one user to perform the loading and enable the first sensorpoint module on the at least one target device.

4. The host of claim 3, wherein the user interface displays status information for the at least one target device, the status information indicating whether the first sensorpoint module has been loaded and enabled.

5. The host of claim 1, wherein the host database includes timestamp information for the first sensorpoint module, the timestamp information including a time during which the first sensorpoint module was last modified.

6. The host of claim 5, wherein the timestamp information includes an identity of a user who performed the last modification.

7. The host of claim 1, wherein the host loads a second sensorpoint module into the running application of the at least one target device.

8. The host of claim 7, wherein the host concurrently enables the first and second sensorpoint modules on the at least one target device.

9. The host of claim 7, wherein the first and second sensorpoint modules share access to a file.

10. The host of claim 1, wherein the host allows the at least one user to specify an access level to the first sensorpoint module by another one of the plurality of users, the access level including one of viewing, modifying, copying, loading, unloading, enabling and disabling the first sensorpoint module.

11. A method, comprising:
 providing access to a workbench to a plurality of connected users, a host device and a plurality of target devices, wherein each of the target devices includes user code and a running application, the workbench including software development tools;

receiving a first sensorpoint module from one of the plurality of users, the first sensorpoint module being created via the workbench;

compiling and linking, by one of the software development tools, the first sensorpoint module at the host device independently from the user codes and running applications of each of the target devices;

storing the first sensorpoint module and a branch instruction for each of the target devices within a host database;

loading each of the branch instructions from the host database into the running applications of one each of the plurality of target devices, wherein each of the branch instructions points to the first sensorpoint module and execution of the first sensorpoint module suspends execution of the running application on each of the target devices.

12. The method of claim 11, further comprising:
providing access to the stored first sensorpoint module to other ones of the plurality of users, wherein the access includes one of viewing, modifying, copying, loading, unloading, enabling and disabling the first sensorpoint module.

13. The method of claim 11, wherein the first sensorpoint is loaded into the running application of one of the plurality of target devices based on input received from the one of the plurality of users.

14. The method of claim 11, further comprising:
loading a second sensorpoint module into the running application of the one of the plurality of target devices and concurrently enabling the first and second sensorpoint modules.

15. The method of claim 11, further comprising:
providing status information regarding the one of the plurality of target devices, the status information indicating whether the first sensorpoint module has been loaded and enabled.

16. The method of claim 11, further comprising:
providing timestamp information for the first sensorpoint module, the timestamp information including a time during which the first sensorpoint module was last modified.

17. The method of claim 16, wherein the timestamp information includes an identity of a user who performed the last modification.

18. A system, comprising:
a plurality of target devices, each including a processor, user code and a running application;
a plurality of user devices; and
a host in networked communication with the plurality of target devices and the plurality of user devices, wherein the host includes a workbench tool accessible to users of the plurality of user devices, the workbench tool allowing at least one of the users to create a sensorpoint module, compile and link the sensorpoint module independently from the user code and running application of the target device, store the sensorpoint module and a branch instruction for each of the target devices onto a host database, and load each of the branch instructions from the host database into the running applications of each of the target devices, wherein each of the branch instructions points to the first sensorpoint module and execution of the first sensorpoint module suspends execution of the running application on each of the target devices.

19. The system of claim 18, wherein the host allows the at least one user to specify an access level to the sensorpoint module by another one of the plurality of users, the access level including one of viewing, modifying, copying, loading, unloading, enabling and disabling the sensorpoint module.

20. The system of claim 19, wherein the host provides status information regarding the target device, the status information indicating whether the sensorpoint module has been loaded and enabled.

* * * * *